(12) United States Patent
Misawa et al.

(10) Patent No.: US 7,982,512 B2
(45) Date of Patent: Jul. 19, 2011

(54) COMMUNICATION SYSTEM COMMUNICATION DEVICE AND METHOD FOR DETERMINING DUTY RATIO OF PWM CONTROL

(75) Inventors: Katsutoyo Misawa, Nukata-gun (JP); Masato Rinnai, Nukata-gun (JP); Toshihiko Matsuoka, Nukata-gun (JP); Hideaki Ishihara, Okazaki (JP)

(73) Assignee: DENSO CORPORATION, Kariya (JP)

( * ) Notice: Subject to any disclaimer, the term of this patent is extended or adjusted under 35 U.S.C. 154(b) by 120 days.

(21) Appl. No.: 12/585,673

(22) Filed: Sep. 22, 2009

(65) Prior Publication Data
US 2010/0017641 A1  Jan. 21, 2010

Related U.S. Application Data

(62) Division of application No. 11/723,434, filed on Mar. 20, 2007, now Pat. No. 7,631,212.

(30) Foreign Application Priority Data

Apr. 3, 2006 (JP) .................................. 2006-101801
Jan. 18, 2007 (JP) .................................. 2007-009205

(51) Int. Cl.
 *H03K 3/017* (2006.01)
(52) U.S. Cl. ........................................ 327/175; 327/172
(58) Field of Classification Search .................. None
 See application file for complete search history.

(56) References Cited

U.S. PATENT DOCUMENTS

| 4,463,352 A | 7/1984 | Forbes et al. |
| 4,546,269 A | 10/1985 | Johnson |
| 4,926,158 A | 5/1990 | Zeigler |
| 5,008,902 A | 4/1991 | Key et al. |
| 5,072,407 A | 12/1991 | Gutz et al. |
| 5,367,541 A | 11/1994 | Barbero |
| 5,392,396 A | 2/1995 | MacInnis |
| 5,526,058 A | 6/1996 | Sano et al. |
| 5,949,253 A | 9/1999 | Bridgewater, Jr. |
| 6,097,754 A | 8/2000 | Fitch et al. |

(Continued)

FOREIGN PATENT DOCUMENTS

JP  A-2005-303631  10/2005

OTHER PUBLICATIONS

Safe_by_Wire_Plus, Version 2.0, Sep. 24, 2004.

*Primary Examiner* — Cassandra Cox
(74) *Attorney, Agent, or Firm* — Posz Law Group, PLC

(57) ABSTRACT

A communication system includes: a master; a plurality of slaves; and a bus for coupling among the master and the plurality of slaves in order to communicate asynchronously among the master and the plurality of slaves. The master supplies electricity to the bus in a power supply period. The master or the slave drives the bus for transmitting a one-bit data through the bus in a data transmission period. The power supply period and the data transmission period are successively performed so that data communication provided by a plurality of one-bit periods is performed among the master and the plurality of slaves. The master finely changes a communication frequency in the data communication. The master changes a drive level of the bus within a predetermined acceptable range in the data communication.

1 Claim, 9 Drawing Sheets

U.S. PATENT DOCUMENTS

| | | | |
|---|---|---|---|
| 6,222,388 B1 | 4/2001 | Bridgewater, Jr. | |
| 6,493,830 B2 | 12/2002 | Kamei | |
| 6,521,081 B2 | 2/2003 | Ditizio et al. | |
| 6,724,166 B2 * | 4/2004 | Narumi et al. | 318/400.23 |
| 7,208,893 B2 * | 4/2007 | Furuki | 318/400.01 |
| 7,248,061 B2 | 7/2007 | Yamamoto et al. | |
| 7,280,308 B2 * | 10/2007 | Kokami | 360/78.04 |
| 7,390,956 B2 * | 6/2008 | Fujiwara | 84/615 |
| 7,456,778 B2 | 11/2008 | Werner et al. | |
| 2004/0008176 A1 * | 1/2004 | Nuimura | 345/102 |
| 2004/0057511 A1 | 3/2004 | Liu | |
| 2004/0119511 A1 | 6/2004 | Stark et al. | |
| 2004/0251878 A1 | 12/2004 | Veselic | |
| 2005/0157671 A1 | 7/2005 | Sugitani | |
| 2005/0249126 A1 | 11/2005 | Chang et al. | |
| 2007/0233920 A1 | 10/2007 | Misawa et al. | |

* cited by examiner

| VARIATION (%) | LOAD DATA (clk) |
|---|---|
| -12 | 56 |
| -8 | 54 |
| -4 | 52 |
| 0 (CENTER) | 50 |
| +4 | 48 |
| +8 | 46 |
| +12 | 44 |

COMMUNICATION SYSTEM COMMUNICATION DEVICE AND METHOD FOR DETERMINING DUTY RATIO OF PWM CONTROL

CROSS REFERENCE TO RELATED APPLICATIONS

This application is a divisional of U.S. patent application Ser. No. 11/723,434 filed on Mar. 20, 2007 and entitled COMMUNICATION SYSTEM, COMMUNICATION DEVICE AND METHOD FOR DETERMINING DUTY RATIO OF PWM CONTROL, and is based on Japanese Patent Applications No. 2006-101801 filed on Apr. 3, 2006, and No. 2007-9205 filed on Jan. 18, 2007, the disclosure of which is incorporated herein by reference.

FIELD OF THE INVENTION

The present invention relates to a communication system, a communication device and a method for determining a duty ratio of PWM control.

BACKGROUND OF THE INVENTION

One of communication protocols suitably used for a wiring in an automotive vehicle is a SbW (Safe by Wire) method. The SbW method is such that electric power supply and communication are only performed with two lines in order to reduce the number of wirings.

FIG. 14 shows a construction that one master 1 (e.g., an ECU for the vehicle) and multiple slaves 2a-2f are connected in a line with a pair of buses 3a, 3b. Each slave 2a-2f includes a switch 4 therein. When a certain slave 2a-2f has trouble, the switch 4 at the certain slave 2a-2f separates off the bus 3a so that only normal slaves 2a-2f continue to communicate among the slaves 2a-2f and the master 1.

FIG. 15 shows a waveform of bus voltage in the bus 3 when the master 1 and/or the slaves 2a-2f drive the bus 3 so that a data is transmitted by the SbW method. In this SbW method, firstly, the master 1 drives the bus 3a, 3b with a voltage level of VLP in a power supply period (i.e., power phase) so that electricity for operating each slave 2a-2f is supplied to the slave 2a-2f. A data period (i.e., data phase) is performed after the power phase. In the data phase, the master 1 and/or the slaves 2a-2f transmit a one-bit data. A total period of the data phase and the power phase is defined as a one-bit period (i.e., a 100% bit phase). The length of the 100% bit phase defines a communication speed. In some cases, the communication speed of one communication system may be changed dynamically.

When the master 1 transmits the data during the data phase, the master 1 drives the bus 3a, 3b with a voltage level of VL0 or VL1. These voltage levels correspond to the data of "0" and "1", respectively. When the slave 2a-2f transmits the data during the data phase, the master 1 drives the bus 3a,3b with a voltage level of VL0. Here, the length of the power phase is equal to the length of the data phase.

At this time, if the slave 2a-2f does not drive the bus 3a, 3b, the voltage level maintains at VL0. Accordingly, in this case, the data of "0" is transmitted. If the slave 2a-2f drives the bus 3a, 3b with the voltage level of VL1, the data of "1" is transmitted. Here, the voltage level of VL1 is lower than the voltage level of VL0. If the slave 2a-2f drives the bus 3a, 3b with the voltage level of VLS1, an interruption is generated in relation to the master 1. Here, the voltage level of VLS0 is lower than the voltage level of VL1.

FIGS. 16A and 16B show one example of data communication between the master 1 and the slave 2a-2f. The master 1 drives the bus 3a, 3b with voltage levels of VLP and VL0 in a 200% bit period, which is twice longer than the one-bit period in the communication rate at that moment, so that a SOF (i.e., start of frame) signal is transmitted. The SOF signal shows start of communication. The slave 2a-2f recognizes the start of communication when the SOF signal is transmitted to the bus 3a, 3b.

Then, the master 1 transmits two data-bit signals of MSA and SEL so that the master 1 specifies a communication mode. After that, the slave 2a-2f transmits the data. Specifically, in FIG. 16A, a data of "SLOT 1_DATA" and a following data of "CRC" represent a data transmitting period of the slave 2a. The data of CRC (i.e., cyclic redundancy check) is a signal for detecting an error, and attached to the data of SLOT 1_DATA. Similarly, the slave 2b transmits a data of "SLOT 2_DATA" and a data of "CRC," the slave 2n transmits a data of "SLOT N_DATA" and a data of "CRC," and so on. In an idling period for waiting the communication, in which the communication is not performed, the master 1 repeats to drive the bus 3a, 3b with the voltage level of VLP and the voltage level of VL0 alternately.

Thus, in the SbW method, the master 1 supplies electricity through the pair of buses 3a, 3b in the power supply period, and further, the master 1 communicates with the slaves 2a-2f. Thus, the SbW method provides a serial communication system.

When the above communication system is used for an air bag system of the vehicle, multiple slaves 2a-2f correspond to acceleration sensors, which are mounted on various parts of the vehicle. When one of sensors detects impact of accident, a detected signal is transmitted from the one of sensors as a slave 2a-2f to the master 1. The master 1 outputs an ignition instruction signal to an inflator of the air bag system. Then, the inflator generates gas so that the air bag expands.

In the above SbW method, if the system functions, the master 1 continues to supply electricity to the slaves 2a-2f. Accordingly, even in the idling period, the master 1 drives the bus 3. Thus, the communication signal having a predetermined frequency may be continuously generated, so that a higher harmonic wave of a fundamental harmonic wave having the predetermined frequency increases with its power. Thus, a noise may be generated easily.

In view of the above problem, a spectrum diffusion communication method and a Bluetooth technique together with a frequency hopping method are provided. Specifically, in these methods, a communication frequency is changed so that a power spectrum is diffused. Thus, a peak intensity of a noise is reduced.

For example, a system inputs a PWM (i.e., pulse width modulation) signal into a driving circuit for driving a load such as a motor so that the system controls to switch on/off. In this system, when a duty ratio of the PWM signal is constant, a higher harmonic wave of the PWM signal increases with its power, so that a noise may be generated easily.

Here, since the SbW method does not spread sufficiently, the inventors could not find an appropriate prior art at this moment.

In the above technique such as the spectrum diffusion communication method, a noise level may be not sufficiently reduced in some cases. Thus, it is required for a communication system to reduce a noise sufficiently. Further, it is required to provide a method for determining a duty ratio of PWM control.

SUMMARY OF THE INVENTION

In view of the above-described problem, it is an object of the present disclosure to provide a communication system. It is another object of the present disclosure to provide a communication device for the communication system. It is further another object of the present disclosure to provide a method for determining a duty ratio of PWM control.

According to a first aspect of the present disclosure, a communication system includes: a master; a plurality of slaves; and a bus for coupling among the master and the plurality of slaves in order to communicate asynchronously among the master and the plurality of slaves. The master supplies electricity to the bus in a power supply period. The master or the slave drives the bus for transmitting a one-bit data through the bus in a data transmission period. The power supply period and the data transmission period are successively performed so that data communication provided by a plurality of one-bit periods is performed among the master and the plurality of slaves. The master finely changes a communication frequency in the data communication. The master changes a drive level of the bus within a predetermined acceptable range in the data communication.

In the above system, the waveform of the communication signal is changed dynamically so that the frequency component of the signal distributes in a wide range. Thus, the peak level of the noise is reduced.

According to a second aspect of the present disclosure, a communication device is used for the communication system. The communication device provides the master. Here, the communication system is defined in the first aspect. Alternatively, the communication device may provide the slave.

According to a third aspect of the present disclosure, a communication system includes: a master; a plurality of slaves; and a bus for coupling among the master and the plurality of slaves in order to communicate asynchronously among the master and the plurality of slaves. The master supplies electricity to the bus in a power supply period. The master or the slave drives the bus for transmitting a one-bit data through the bus in a data transmission period. The power supply period and the data transmission period are successively performed so that data communication provided by a plurality of one-bit periods is performed among the master and the plurality of slaves. The master finely changes a communication frequency in the data communication. The master changes a time for a level transition when the master drives the bus.

In the above system, the slope of the waveform of the communication signal is changed dynamically when the signal level is changed. Thus, the frequency range of the signal is expanded, so that the peak level of the noise is reduced.

According to a fourth aspect of the present disclosure, a method for determining a duty ratio of a PWM control is provided. The method includes: outputting a PWM signal to a driving circuit so that switching of a load is controlled; determining a duty ratio target value of the PWM signal; changing the duty ratio of the PWM signal around the duty ratio target value as a center of a variation in such a manner that an average of the variation of the duty ratio in a predetermined period coincides with the duty ratio target value; measuring a noise level when the PWM signal is outputted to the driving circuit; memorizing a data of the noise level together with the variation of the duty ratio in the changing the duty ratio; and determining the variation of the duty ratio based on the data of the noise level when an operational environment or an operational condition are given so that the noise level in a given frequency range as a reduction object is reduced.

In the above method, the switching of the load is controlled with the PWM signal, and the noise level of the noise caused by the switching is reduced. Further, the frequency of the noise is dispersed. Thus, the variation of the duty ratio is optimized in such a manner that the noise level in the given frequency range is reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
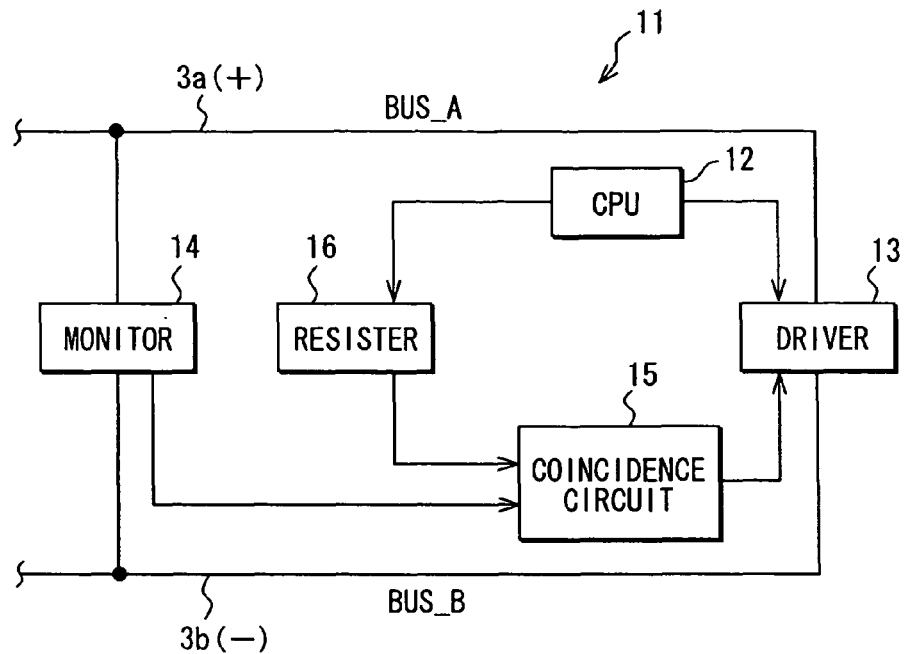
FIG. 1 is a circuit diagram showing a master in a communication system with using a SbW method according to a first embodiment.

FIGS. 1-8 show a communication system by using a SbW method. Specifically, FIG. 1 shows a communication device 11 as a master. The master 11 drives a pair of buses 3a, 3b by controlling a voltage driver 13 with a CPU 12. The buses 3a, 3b are defined as BUS_A and BUS_B.

A voltage monitor 14 is formed between the buses 3a, 3b so that the voltage monitor 14 monitors a drive level of the buses 3a, 3b. The voltage monitor 14 outputs a data to a coincidence circuit 15, the data corresponding to monitoring result. A data stored in a setting value register 16 is inputted in the coincidence circuit 15, the data written by the CPU 12 into the register 16. The coincidence circuit 15 outputs a coincidence signal to the voltage driver 13 when the setting value coincides with the monitoring result data.

Figure 2:
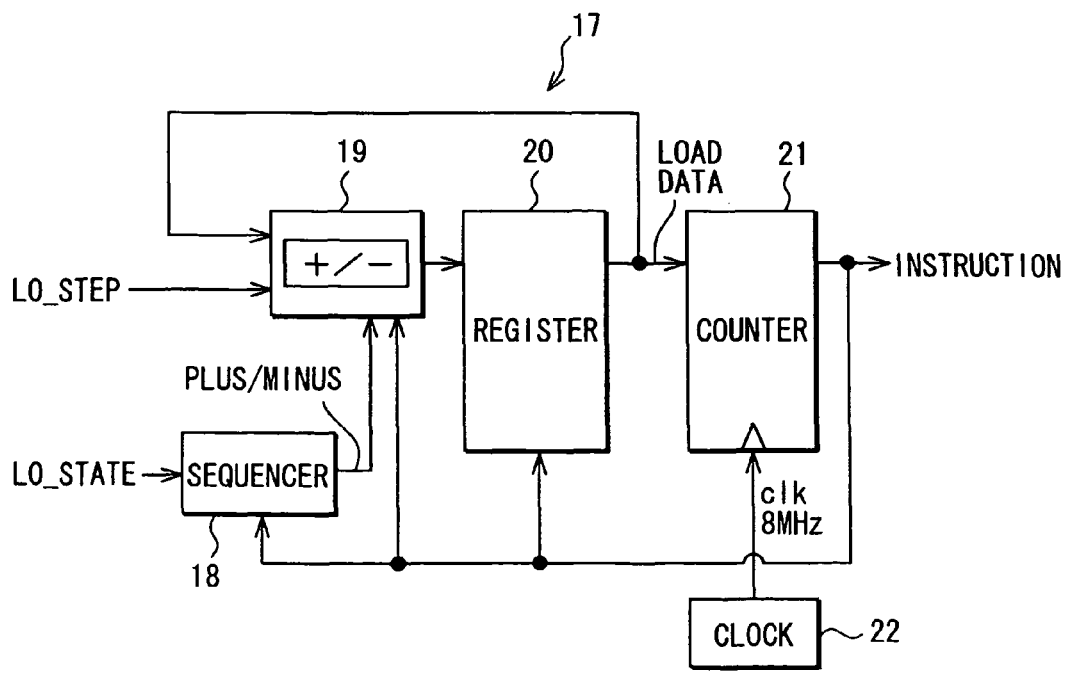
FIG. 2 is a circuit diagram showing a frequency dispersion element in a voltage driver of the master.

FIG. 2 shows a frequency dispersion element 17 accommodated in the voltage driver 13. The frequency dispersion element 17 finely changes a bit rate of communication. The frequency dispersion element 17 includes a state transition sequencer 18, an adder-subtractor 19, a register 20, a counter 21 and a clock circuit 22. The clock circuit 22 supplies a clock signal of "CLK" to the counter 21. The clock signal has a frequency of, for example, 8 MHz. The CPU 12 inputs a control data of "L0_STATE" into the sequencer 18. The sequencer 18 outputs the control signal of "PLUS/MINUS" every time the counts of the driving instruction by the sequencer 18 becomes the data of "L0_STATE," the driving instruction outputted from the counter 21. The control signal of "PLUS_MINUS" provides to switch between adding function and subtracting function of the adder-subtractor 19.

The CPU 12 inputs the data of "L0_STEP" into the adder-subtractor 19, the data of "L0_STEP" corresponding to dispersion of frequency. The data of "L0_STEP" and the output data of the register 20 are added or subtracted every time the driving instruction from the counter 21 is outputted twice (i.e., the driving instruction is the voltage level of "VLP" in a power phase and the voltage level of "VL0" or "VL1" in a data phase). The output of the register 20 is loaded by the counter 21. The counter 21 counts down the loaded data (i.e., LOAD DATA) with using the clock signal of "CLK." The counter 21 outputs the driving instruction in accordance with the counted value.

Figure 3A:
FIG. 3A is a table showing a relationship between a variation of communication bit rate and a load data.
Figure 3B:
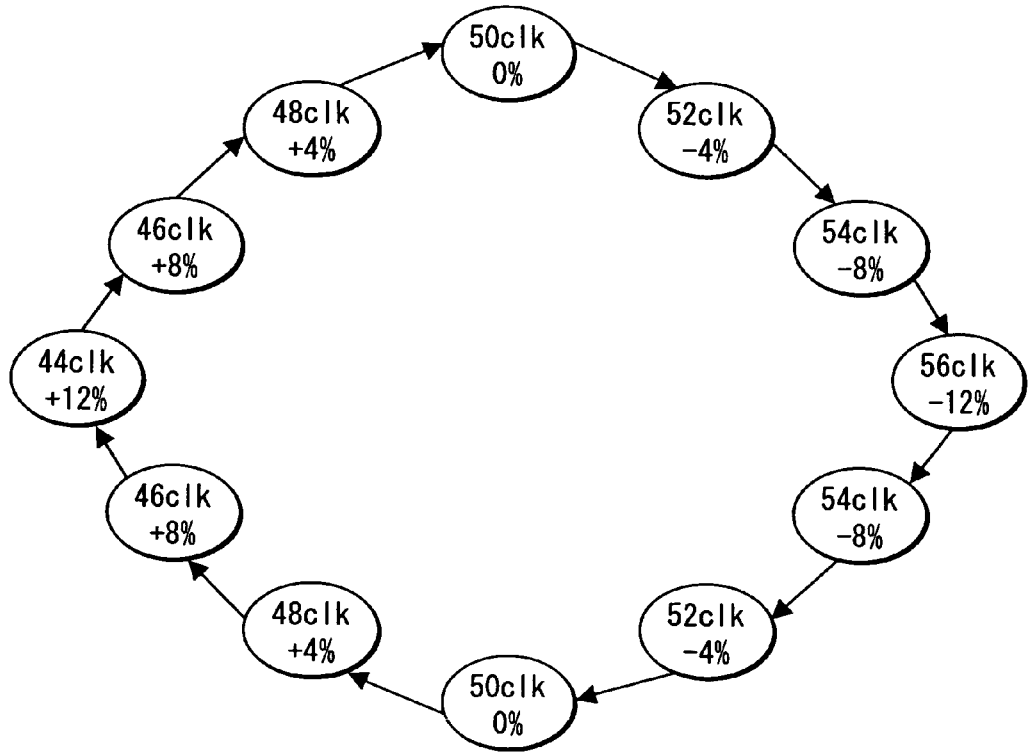
FIG. 3B is a chart showing a state transition condition.

FIGS. 3A and 3B show an example of a state condition for changing a communication bit rate by the frequency dispersion element 17. FIG. 3A shows a relationship between the value of the load data in relation to the counter 21 and the communication rate. The value of the load data is the number of down count with the clock signal of "CLK." The fundamental rate, at which the variation is zero, is 80 kbps. The CPU has a 8 MHz clock signal. When the clock signal of "CLK" having the frequency of 8 MHz is counted to 50 counts, a 50% bit period (i.e., a half of one bit transmitting period) is obtained. The communication rate is changed by ±4% from the fundamental rate as a center. Maximum change of the communication rate is ±12% from the center.

Specifically, when the load data is increased from "50 counts" by "2 counts" so that the load data becomes "52 counts," "54 counts," and "56 counts," the communication rate becomes "−4%," "−8%," and "−12%" from the fundamental rate. Thus, in this case, the fundamental rate becomes slower. When the load data is decreased from "50 counts" by "2 counts" so that the load data becomes "48 counts," "46 counts," and "44 counts," the communication rate becomes "+4%," "+8%," and "+12%" from the fundamental rate. Thus, in this case, the fundamental rate becomes quicker. Thus, the data of "L0_STEP [3:0]" is equal to "0001" so that the load data is changed by "2 counts," which corresponds to 8 MHz. The data of "L0_STATE [3:0]" is equal to "0011" so that the variation of ±4% from the center is obtained.

FIG. 3B shows a state transition diagram. The "50 counts" state defines a starting point, at which the variation is "0%." The load data is reduced from "50 counts," "48 counts," "46 counts" and "44 counts" as a minimum load data. Then, the adding process is performed so that the load data is increased from "44 counts," "46 counts," "48 counts," "50 counts," . . . , and "56 counts" as a maximum load data. Then, the subtracting process is performed so that the load data is decreased from "56 counts" to "44 counts." This state transition is repeated circularly so that the communication rate is finely changed from +12% to −12% by ±4%.

Figure 4A:
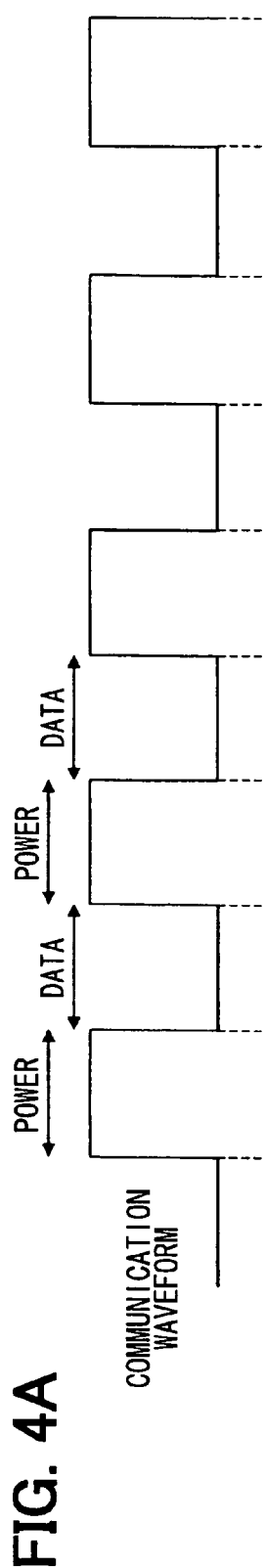
FIG. 4A to 4D are graphs showing a timing chart of operation of the frequency dispersion element.
Figure 4B:
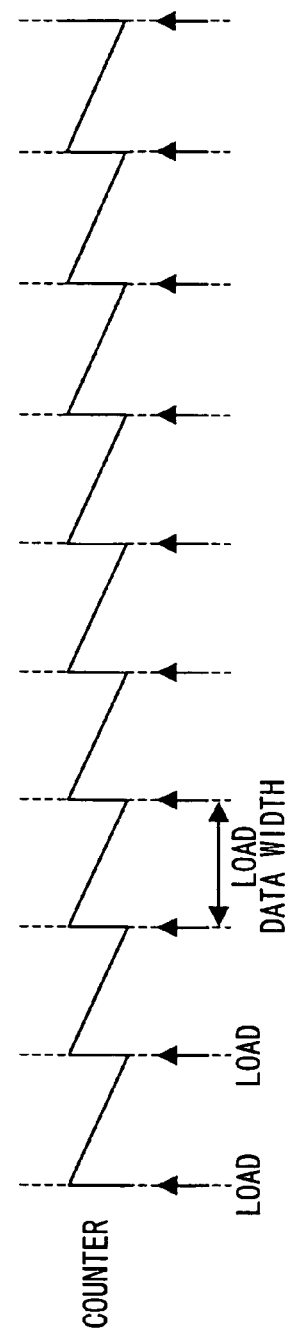
Figure 4C:
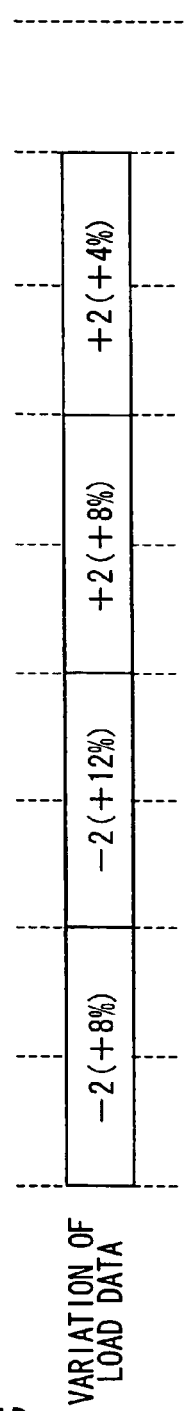
Figure 4D:
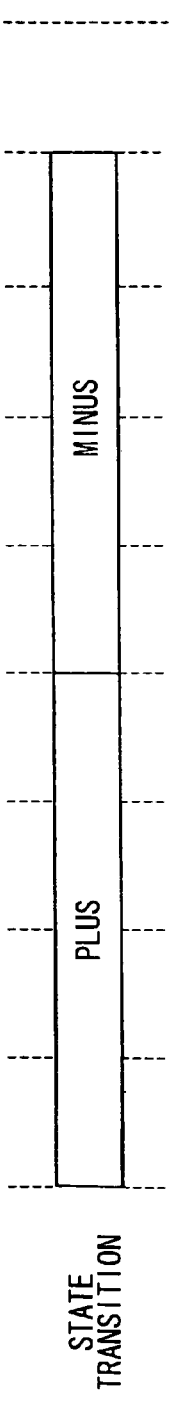

FIGS. 4A to 4D show an example timing chart of operation of the frequency dispersion element 17. As shown in FIG. 4C, the variation of a data to be loaded in the counter 21 shifts from +8%, +12%, +8% to +4%. In the communication waveform in two cycles of the first half, the adder-subtractor 19 performs a subtracting process, and, in the communication waveform in two cycles of the second half, the adder-subtractor 19 performs an adding process. Here, the communication waveform in FIG. 4A is not an actual waveform driven on the bus 3a, 3b but a rectangular waveform as a matter of convenience.

Figure 5:
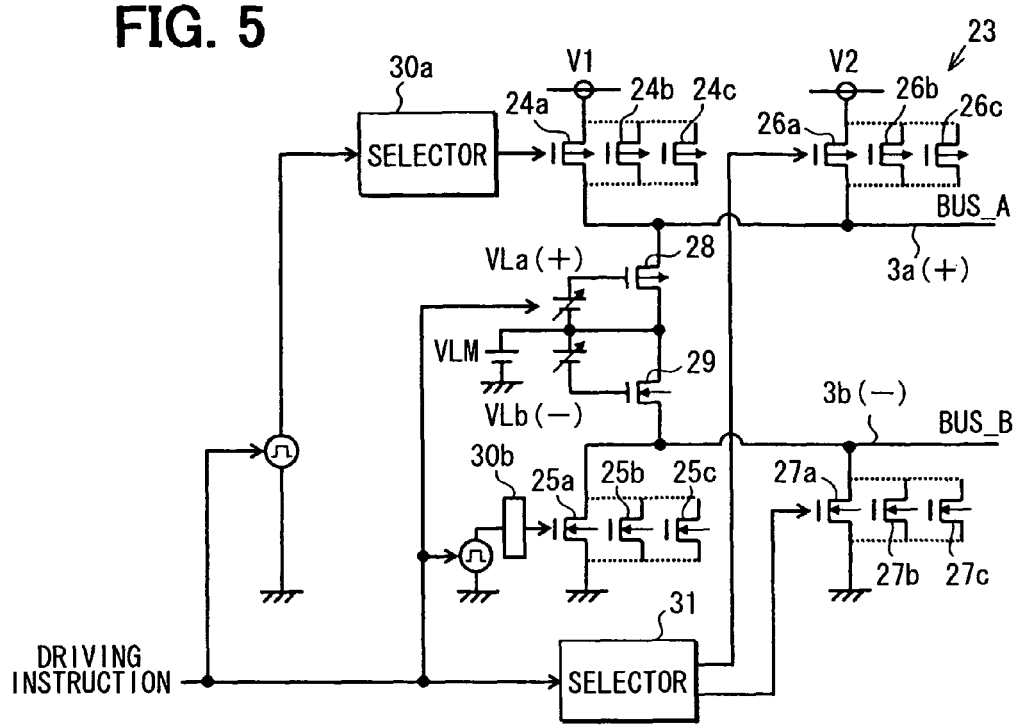
FIG. 5 is a circuit diagram showing a driving voltage/current control element in the voltage driver.

FIG. 5 shows a driving voltage/current control element 23 in the voltage driver 13. The driving voltage/current control element 23 includes multiple P channel MOS transistors 24a-24c, 26a-26c, 28 and multiple N channel MOS transistors 25a-25c, 27a-27c, 29. Specifically, a part of the P channel MOS transistors 24a-24c are connected in parallel between a power source V1 and the bus 3a. Another part of the P channel MOS transistors 26a-26c are connected in parallel between a power source V2 and the bus 3a. Further, one of the P channel MOS transistors 28 is connected in series between the bus 3a and the bus 3b. A part of the N channel MOS transistors 25a-25c are connected between a ground and the bus 3b. Another part of the N channel MOS transistors 27a-27c are connected between the ground and the bus 3b. Further, one of the N channel MOS transistors 29 is connected in series between the bus 3a and the bus 3b. The voltage of the power source V1 is, for example, 14 Volts, and the voltage of the power source V2 is, for example, 7 Volts.

The driving instruction from the frequency dispersion element 17 provides a trigger for the gate signal of each MOS transistor 24a-24c, 25a-25c, 26a-26c, 27a-27c, 28-29. The driving instruction is inputted in the gate signal of each MOS transistors 24a-24c, 25a-25c, 26a-26c, 27a-27c, 28-29 through the selector circuit 30a, 30b, 31. A common connection portion of the MOS transistors 28, 29 provided by a drain thereof is connected to a reference power source VLM. A direct current power source VLa, VLb is connected between the common connection portion and the gate of each transistor 28, 29. The direct current power source VLa, VLb is capable of changing a level thereof.

When the driving voltage/current control element 23 drives the buses 3a, 3b with the level of "VLP" and "VL0," an on-state and an off-state of each transistor 24a-24c, 25a-25c, 26a-26c, 27a-27c, 28-29 are set as follows.

In each transistor 24a-24c, the level of "VLP" is set to the on-state, and the level of "VL0" is set to the off-state. In each transistor 25a-25c, the level of "VLP" is set to the on-state, and the level of "VL0" is set to the off-state. In each transistor 26a-26c, the level of "VLP" is set to the off-state, and the level of "VL0" is set to the on-state. In each transistor 27a-27c, the level of "VLP" is set to the off-state, and the level of "VL0" is set to the on-state. In the transistor 28, the level of "VLP" is set to the off-state, and the level of "VL0" is set to the on-state. In the transistor 29, the level of "VLP" is set to the on-state, and the level of "VL0" is set to the off-state.

When the bus 3a, 3b is driven with the level of "VLP," the selector circuit 30a, 30b controls to turn on at least one transistor 24a-24c, 25a-25c. In this case, the level of "VLP" is determined by the voltage of the power source V1 and the number of transistors 24a-24c, 25a-25c that are set to the on-state at the same time. For example, when a case where only the transistors 24a, 25a are set to the on-state is compared with a case where all transistors 24a-24c, 25a-25c are set to the on-state, the latter case is equivalent to increase the size W of transistor; and therefore, current supply performance to the buses 3a, 3b is improved. Further, the on-state resistance of the transistors 24a-24c, 25a-25c is reduced. As a result, the voltage level of "VLP" becomes much higher.

When the bus 3a, 3b is driven with the level of "VL0," the selector circuit 31 controls to turn on at least one transistor

26a-26c, 27a-27c. Further, both of the transistors 28, 29 are set to the on-state when the gate voltage of each transistor 28, 29 is obtained by controlling the voltage of the direct current power source VLa, VLb. In this case, the level of "VL0" is determined as follows. Here, the threshold voltage of each transistor 28, 29 is defined as VT, the voltages of the direct current power source VLa, VLb are defined as VLa, VLb, and the voltage of the reference power source VLM is defined as VLM.

The voltage level of the bus 3a is equal to "VLM+VLa+ VT," and the voltage level of the bus 3b is equal to "VLM− VLb−VT." The voltage level of "VL0" is a difference between the voltage levels of the buses 3a, 3b. Thus, the voltage level of "VL0" is obtained as follows.

$$VL0 = VLa + VLb - 2VT \tag{F1}$$

In this case, the level of "VL0" is finely changed by controlling the number of the transistors 26a-26c, 27a-27c that are set to the on-state. Thus, the current supply performance to the buses 3a, 3b is changed. Selection of the number of the transistors that are set to the on-state by using the selector circuits 30, 31 may be changed at the time when the bus 3a, 3b is driven with each voltage level. Alternatively, the selection may be changed during one driving period.

Figure 6:
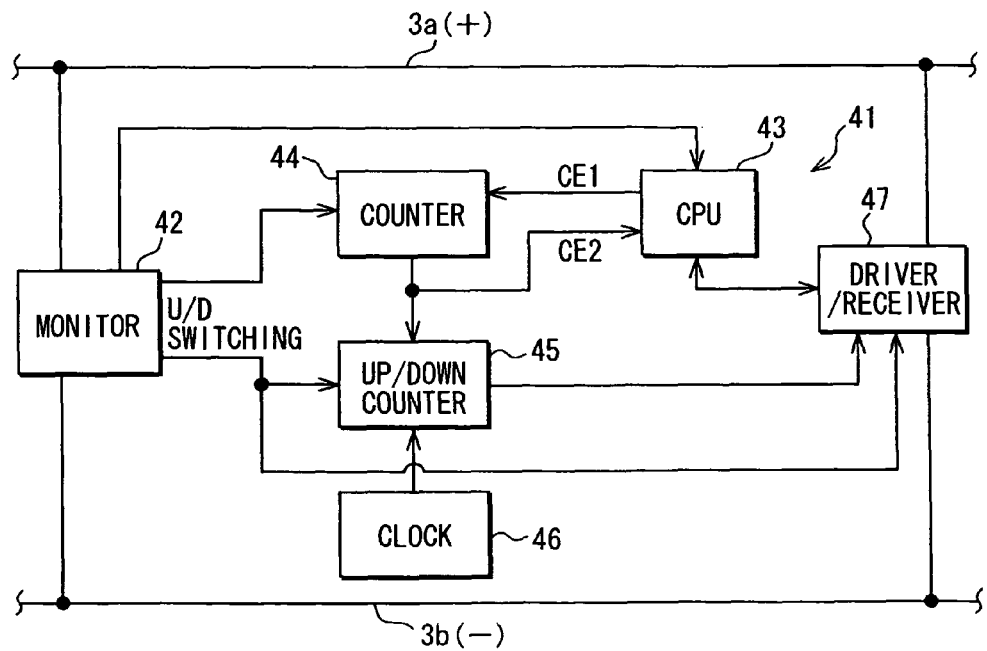
FIG. 6 is a circuit diagram showing a slave in the communication system.

FIG. 6 shows a construction of a communication device 41 as a slave. A voltage monitor circuit 42 is connected between the buses 3a, 3b. The monitor circuit 42 monitors the voltage of each bus 3a, 3b, which is driven by the master 11. By using the monitor circuit 42, the slave 41 obtains information for recognizing the communication timing. The monitor circuit 42 includes a comparator therein for comparing the voltage level. The monitor circuit 42 monitors whether the driving level of the bus 3a, 3b is normal or not. The monitoring result is inputted in the CPU 43 as a microcomputer.

The monitoring circuit 42 sets the threshold voltage of "VDC" for counting data to be slightly higher than the voltage level of "VL0." The monitor circuit 42 outputs one-shot pulse to a data counter 44 every time an initial rise of the voltage level of the bus 3a, 3b exceeds the threshold voltage of "VDC." Further, the monitor circuit 42 sets an U/D switching signal (i.e., up/down switching signal) to be a high level when the voltage level of the bus 3a, 3b keeps the level of "VLP." The monitor 42 outputs the U/D switching signal to the up/down counter 45. When the master 11 stops to drive the bus 3a, 3b in the power phase, the voltage level of the bus 3a, 3b is decreased from the level of "VLP" by a predetermined value, and the U/D switching signal changes from the high level to the low level.

The up/down counter 45 performs a counting operation based on a count clock signal outputted from the clock circuit 46 when a count enable signal (i.e., CE2) from the data counter 44 is in active. When the U/D switching signal is in the high level, the up/down counter 45 performs an up-count operation. When the U/D switching signal is in the low level, the up/down counter 45 performs a down-count operation. Further, the U/D switching signal is inputted in a communication driver/receiver 47.

The CPU 43 operates the communication driver/receiver 47 to drive the bus 3a, 3b so that a data is transmitted to the master 11. Further, the CPU 43 operates the communication driver/receiver 47 to receive the data transmitted from the master 11. The master 11 transmits the electricity in the power phase. The electricity is smoothed by a power source circuit (not shown) so that the smoothed electricity is supplied to each part of the slaves 41 as an operational power.

The CPU 43 changes the count enable signal CE1 to be active when the communication driver/receiver 47 detects that the master 1 transmits the SOF signal through the bus 3a, 3b. The count enable signal CE1 is inputted into the data counter 44. Then, the data counter 44 starts to count the number of data from a time when the SOF signal is outputted, the data which are transmitted through the bus, 3a, 3b. The counting of the number of data is counting of pulses, which is inputted from the monitor circuit 42 to the data counter 44. When the counted number of data becomes a predetermined value corresponding to a start for data transmitting phase of the slave 11, the CPU changes the count enable signal CE2 to be active, the count enable signal CE2 being inputted into the up/down counter 45.

When the enable signal CE2 becomes active and the U/D switching signal changes from the high level to the low level, the communication driver/receiver 47 starts to drive the bus 3a, 3b in accordance with the transmitted data from the CPU 43. However, when the data of "0" is transmitted from the CPU 43, the communication driver/receiver 47 does not drive the bus 3a, 3b.

Figure 7:
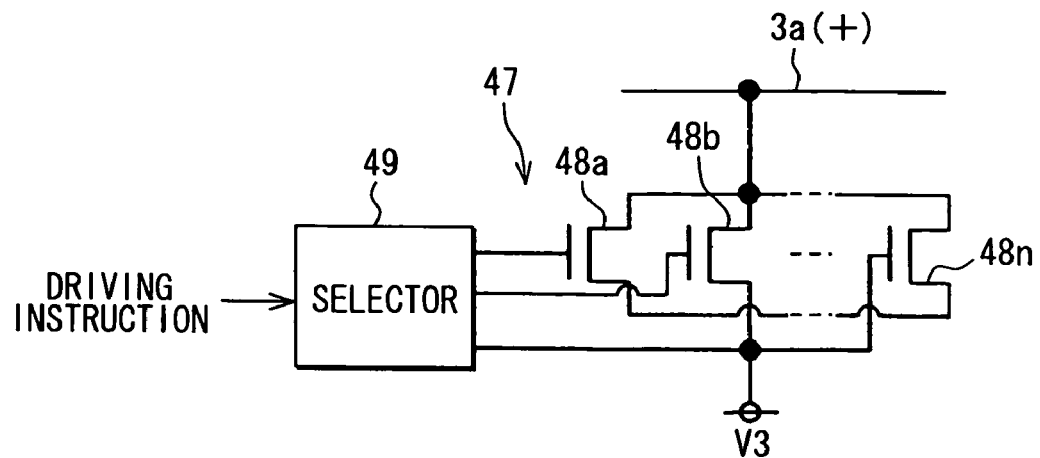
FIG. 7 is a circuit diagram showing a construction for driving a bus with a level "VL1" or "VLS0" in the driver/receiver.

FIG. 7 shows a part of construction in the communication driver/receiver 47, the part driving the bus 3a, 3b with the level of "VL1" or "VLS0." Multiple N type MOS transistors 48a, 48b-48n are connected in parallel between the bus 3a and the power source V3. The gate signal is inputted from the selector circuit 49 into the gate of each transistor 48a-48n.

The selector circuit 49 chooses the number of transistors 48a-48n in accordance with the driving instruction inputted from the CPU 43, similar to the selector circuits 30a, 30b, 31. Based on the selection of the selector circuit 49, the driving level is changed and the current supply performance to the bus 3a, 3b is changed when the slave 41 drives the bus 3a, 3b with the voltage level of "VL1" or "VLS0."

Figure 8:
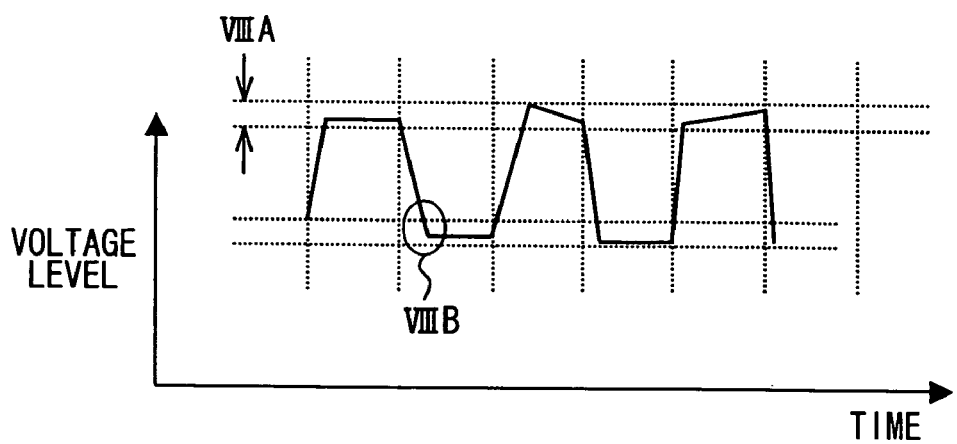
FIG. 8 is a graph showing a voltage waveform when the master or the slave drives the bus.

Next, the function of the above communication device 41 is explained as follows. FIG. 8 shows a waveform in the bus 3a, 3b when the master 11 and the slave 41 drive the bus 3a, 3b with changing the driving level and the current supply performance. Specifically, the driving level of "VLP" and "VL0" are changed in each driving period, and the slope of rise and/or decay of the voltage level are changed in accordance with change of the current supply performance. When the slope of rise and decay is reduced, the waveform at a changing point VIIIB of the driving level is changed gently. Thus, generation of a higher harmonic wave is reduced. Here, the voltage level is changed within a predetermined specification range VIIIA in FIG. 8.

The driving state is changed together with finely change of the communication rate. Accordingly, a distribution of frequency spectrum generated in accordance with the communication waveform widely expands, compared with a case of only the finely change of the communication rate. Thus, unwanted radiation level generated in accordance with the communication in total frequency range is reduced since concentration to a specific frequency is much reduced.

Each driving level is set to a following voltage in the SbW method, for example.

The voltage level of VLP is 12 volts, the voltage level of VL0 is 5 volts, the voltage level of VL1 is 3 volts, and the voltage level of VLS0 is 0 volt. In each level, an acceptable range between a lower limit and an upper limit is, for example, in a range between 0.5 volts and 1.4 volts. Accordingly, when the master 11 and the slave 41 drive the voltage level, the level is changed within the above acceptable range.

Thus, the master 11 finely changes the communication frequency during the communication, and changes the driving level of the bus 3a, 3b within the acceptable range. Thus, the peak level of noise is much reduced. Further, the master 11 changes the current driving performance when the master 11 drives the bus 3a, 3b so that a time interval for level transition is changed. Accordingly, the slope of the waveform is dynamically changed when the signal level is changed. Thus, the frequency band of the signal expands sufficiently, so that the peak level of noise is much reduced. Further, since the master 11 finely changes the communication frequency based on a predetermined cyclic pattern, a construction for providing fine change of the frequency is simplified.

Furthermore, the slave 41 changes the driving level when the slave 41 drives the bus 3a, 3b during the communication. Further, the slave 41 changes the current driving performance so that the time interval for level transition is changed. Thus, the peak level of noise is much reduced.

Second Embodiment

FIGS. 9A-9C, and 10-11 show a SbW method according to a second embodiment. Although the frequency is finely changed with one cycle of 12 bits data in the SbW method according to the first embodiment, the frequency on the master side is changed with a communication frame as a unit of cycle. The communication frame is a set of bit data.

Figure 9A:
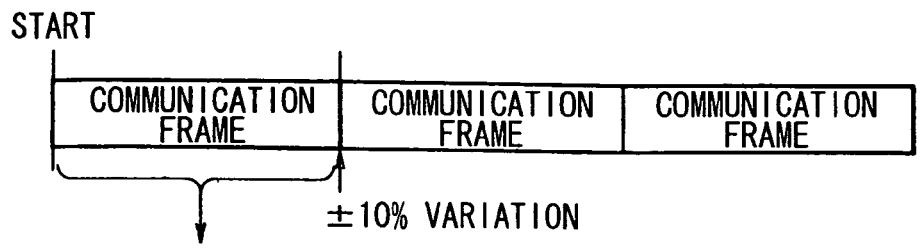
FIG. 9A to 9C are charts showing a method for changing a bit rate finely, according to a second embodiment.
Figure 9B:
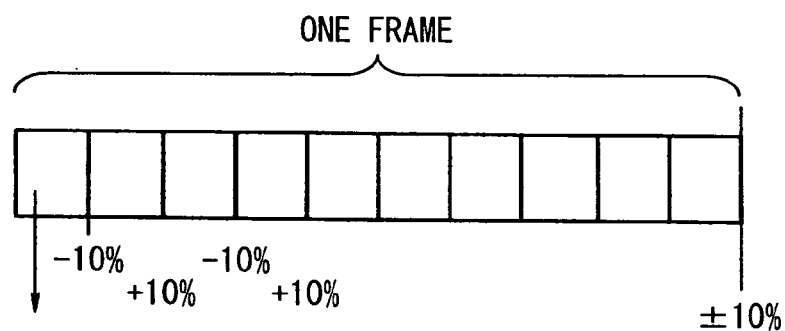

As shown in FIGS. 9A and 9B, each communication frame includes multiple data bits. The transmission time for the communication frame has an acceptable range of variation in relation to an initial setting time based on specifications for communication protocol. For example, when the acceptable range of variation is ±10%, a total variation is set to be within the acceptable range of variation when the transmission period of each bit, i.e., a bit rate, in one communication frame is changed.

Figure 9C:
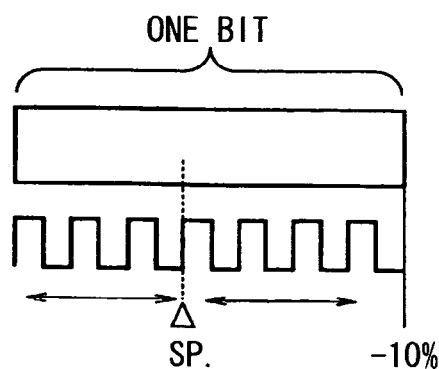

Specifically, when the number of bits in one frame is ten, for example, the transmission period of one of bits is not changed, the transmission period of each of five bits is changed by +10%, and the transmission period of each of four bits is changed by −10%. In this case, the total variation of one frame is +10%. When the fundamental rate is 80 kbps, and when the rate is changed by −10%, the data to be loaded into a rate determining counter for 100% bit period is set to "110," as shown in FIG. 9C. The sampling point S.P in FIG. 9C shows a timing in a case where a receiving side samples a bit data in the middle of the one bit period in a well-known serial communication.

Figure 10:
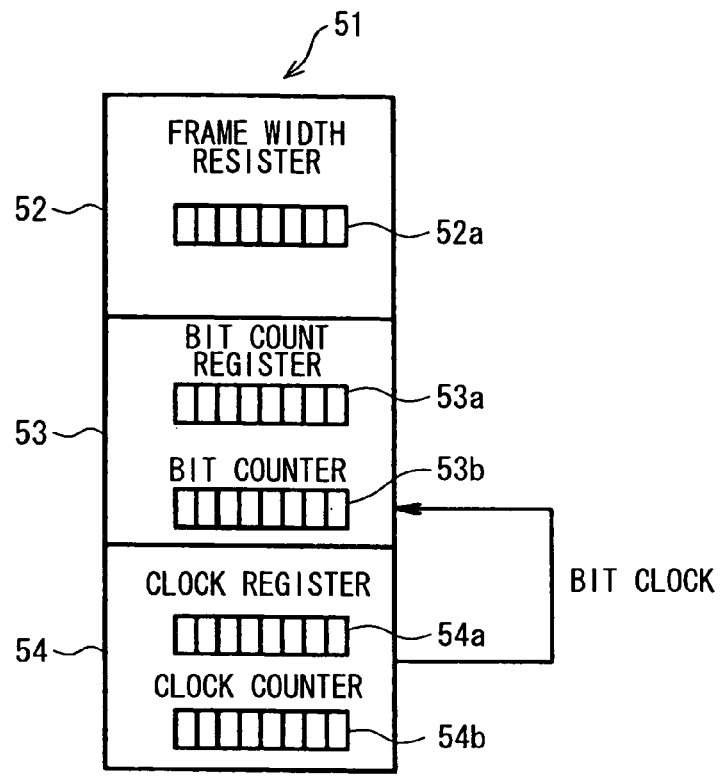
FIG. 10 is a circuit diagram showing a construction for controlling and changing the bit rate.

FIG. 10 shows a construction for controlling the change of bit rate. A control portion 51 for controlling the change includes a frame width controller 52, a bit count controller 53 and a bit rate controller 54. The frame width controller 52 includes a register 52a for determining a width of one communication frame, i.e., the transmission time. The bit count controller 53 includes a register 53a for setting the number of bits of the communication frame and a counter 53b for counting the number of transmission times of the one bit data. The bit rate controller 54 includes a register 54a for setting the communication rate in each bit composing the frame and a counter 54b for counting the bit rate.

In the bit rate controller 54, a comparator (not shown) compares the number of clocks counted by the counter 54b with the number of clocks set by the register 54a. When the number by the counter 54b coincides with the number by the register 54a, the 100% bit period is determined, and the bit clock is generated. The bit clock is inputted in the counter 53b of the bit count controller 53. The data of each bit in the register 54a is switched by a multi-plexer in the bit rate controller 54 so that the data provides a comparison reference.

In the bit count controller 53, the counter 53b counts the number of outputs of the bit clock. When the counted number coincides with the setting value of the register 53a, one frame ends.

Figure 11:
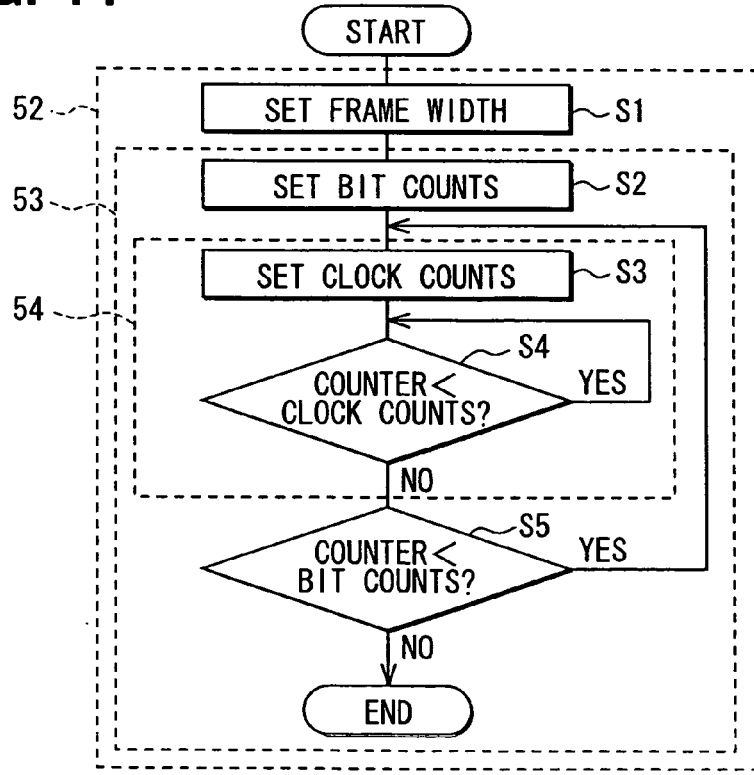
FIG. 11 is a flow chart showing a process in a variation control portion.

FIG. 11 shows a procedure in the control portion 51. In this procedure, a processing step processed by a hard ware is also included. Firstly, in Step S1, in the frame width controller 52, the width of one communication frame is set within the acceptable range of the specifications. In Step S2, the number of bits to transmit in one frame is set in the register 53a of the bit count controller 53. Alternatively, in Step S2, the number of bits may be automatically determined based on a relationship between the frame width set in Step S1 and the fundamental rate.

Next, in Step S3, in the bit rate controller 54, the bit rate to transmit at the beginning is registered in the register 54a. The bit rate includes a variation. Then, in Step S4, when the number of counts in the counter 54b coincides with the data of the register 54a, it goes to Step S5, i.e., when the number of counts is not smaller than the number of clocks (i.e., when it is determined to be "NO"), it goes to Step S5. In Step S5, in the bit count controller 53, when the number of counts in the counter 53b does not coincide with the setting value in the register 53a, it returns to Step S3, i.e., when the number of counts is smaller than the number of counts (i.e., when it is determined to be "YES"), it returns to Step S3. Another bit rate data to transmit next is registered in the register 54a. Alternatively, the bit rate may be automatically determined based on a relationship among the frame width, the number of bits and the fundamental rate set in Steps S1 and S2.

Thus, Steps S3-S5 are repeated. When the number of counts in the counter 53b coincides with the setting value of the register 53a in Step S5, i.e., when it is determined to be "NO," the transmission process of one frame ends. Here, a step for changing a voltage level of data is similar to the first embodiment.

Thus, the master 1 determines the variation of the transmission time within the acceptable range, the transmission time of the communication frame as a set of communication data. Then, the transmission time of one bit period composing the communication frame is changed in such a manner that total of each variation is disposed in the variation of the communication frame. Accordingly, since the time variation for one bit period can be controlled variedly within a certain range of the communication frame, the peak of noise level is much reduced. Further, frequency of noise is much dispersed.

When each bit rate is changed, the absolute value of the variation may be changed in each bit. Further, the total variation may be smaller than the acceptable range of the frame. Furthermore, the variation of the frame may be smaller than the maximum acceptable value, which is defined in the specifications.

Third Embodiment

Figure 12:
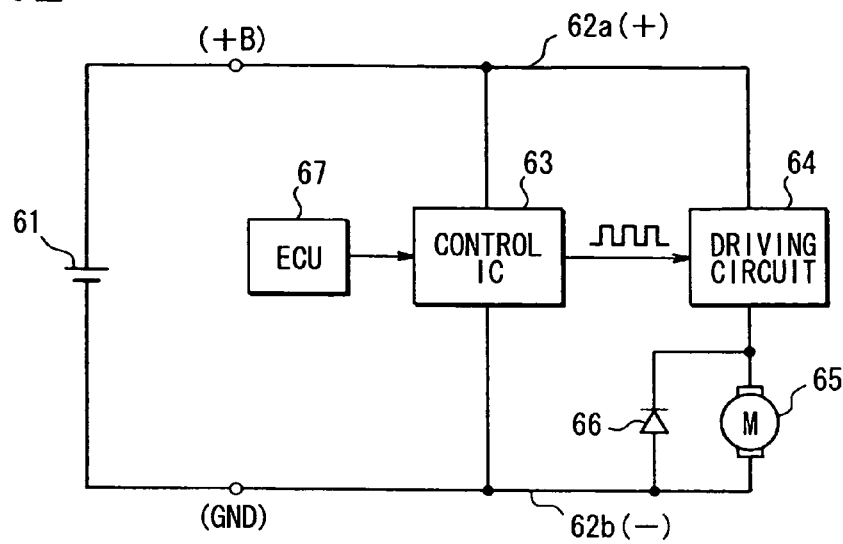
FIG. 12 is a circuit diagram showing a driving control device for controlling and driving a motor on a vehicle.
Figure 13:
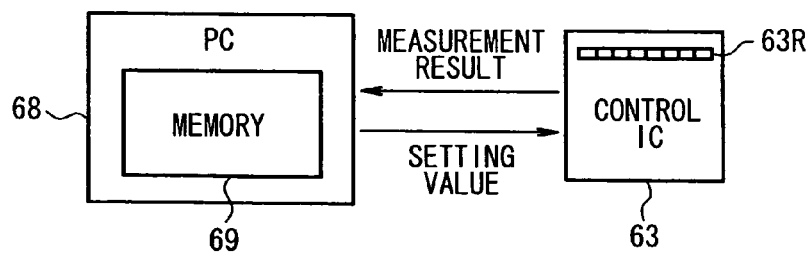
FIG. 13 is a chart showing a process for exchanging information between a control IC and a database.
Figure 15:
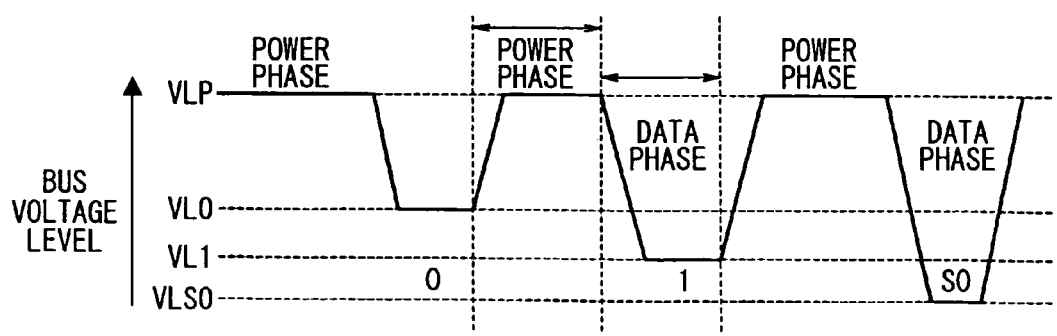
FIG. 15 is a graph showing a voltage waveform when a master or a slave drives a bus in the system.
Figure 14:
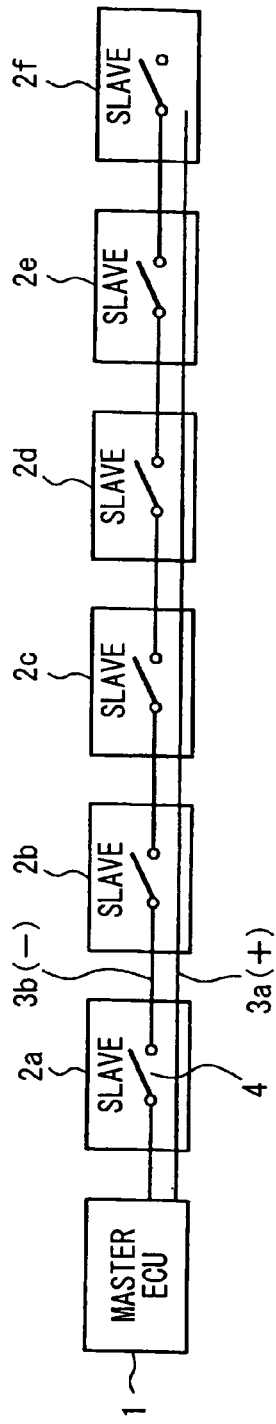
FIG. 14 is a circuit diagram showing a communication system according to a related art.
Figure 16A:
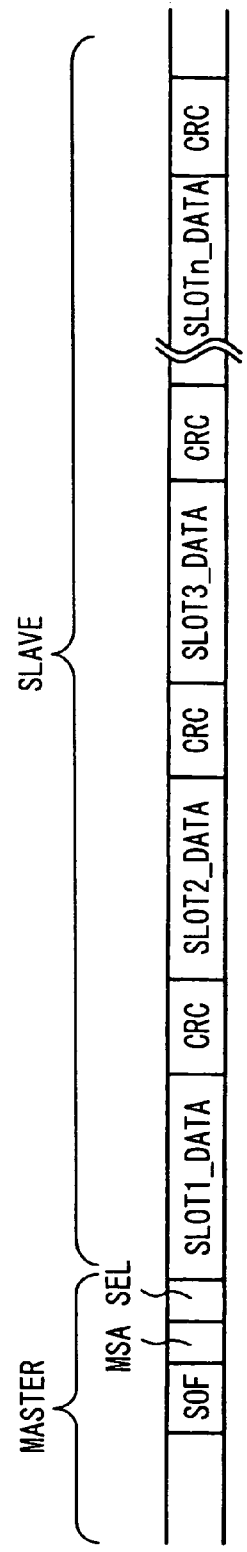
FIGS. 16A and 16B are charts showing a data communication between the master and the slave.
Figure 16B:
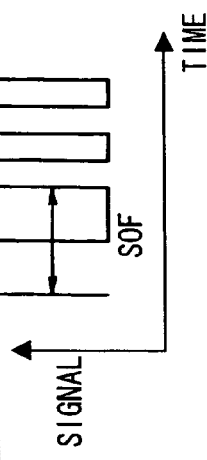

FIGS. 12 and 13 show a communication system according to a third embodiment. Specifically, FIGS. 12 and 13 show a method for optimally determining a variation of PWM duty ratio. The PWM duty ratio is provided by a driving control device when the driving control device drives a direct current motor with a PWM control method. FIG. 12 shows the driving control device for driving the direct current motor, and the driving control device is mounted on a vehicle. A positive side of a battery 61 of the vehicle is connected to a power supply line 62a, and a negative side of the battery 61 is connected to a power supply line 62b. A control IC 63 (i.e., a driving control device and a duty ratio changing means) is connected between the power supply lines 62a, 62b. Further, a driving circuit 64 and a motor 65 as a load are connected in series between the power supply lines 62a, 62b. The motor 65 is connected in parallel to a flywheel diode 66.

The control IC 63 receives a control signal from an external ECU 67, so that the control IC 63 outputs a driving signal as a PWM signal into the driving circuit 64. Thus, the operation of the motor 65 is controlled. The driving circuit 64 includes a driving element such as a power MSFET. The control IC 63 determines a predetermined instruction for duty ratio of the PWM signal in accordance with the control signal from the ECU 67. The instruction is changeable by a method similar to the first and second embodiments.

For example, when the instruction for the duty ratio, which is determined by the control IC 63, is 70%, the instruction is changed within a range of ±5% so that the instruction is disposed between 65% and 75%. When the duty ratio of the PWM signal is averaged per a predetermined time, the average duty ratio is equal to the instruction of 70%. Thus, the driving electricity of the motor 65 corresponds to the PWM duty ratio of 70%. When the PWM duty ratio is fixed to 70%, a noise may be generated by a higher harmonic wave. However, in the above method, the peak of noise is sufficiently reduced, and further, the frequency of noise is dispersed.

FIG. 13 shows a method for optimizing a variation of duty ratio for the PWM signal in each product. Specifically, when the variation of duty ratio for the PWM signal is changed, generation of noise may be changed in accordance with the variation of duty ratio. Accordingly, the control IC 63 having a predetermined variation pattern is assembled in the product. When the control IC 63 functions, the noise generated in a case where the motor 65 is driven is measured. This measurement result is memorized in a personal computer (i.e., PC) 68.

Multiple measurement results are obtained by changing the variation pattern, so that the measurement results are memorized in the PC 68. Thus, a data base of frequency dispersion is formed in a measurement result memory 69. By referring to the data base in the memory 69, the optimum variation pattern for reducing the noise is obtained in accordance with use conditions, environment, and working status of each product, a type of load, manufacturing variation of the control IC 63, and a required noise level and required frequency characteristic of the product.

Accordingly, before the control IC 63 is shipped, the optimum pattern for changing the PWM duty ratio is determined in accordance with the product. Then, the optimum pattern is registered in an inner register 63R in the control IC 63. In this case, the control IC 63 controls to change the PWM duty ratio based on the changing pattern registered in the inner register 63R.

Thus, the control IC 63 finely changes the duty ratio of the PWM signal around the instruction value as the center in such a manner that the time average of the duty ratio in a predetermined period coincides with the instruction value. The PWM signal is to output to the driving circuit 64. In this case, the noise measurement result data together with the duty ratio variation are memorized in the data base in the memory 69. The noise measurement result data is a level measurement result of noise component, which is generated when the PWM signal is inputted in the driving circuit 64. The variation of the duty ratio of the PWM signal is determined by the control IC 63 based on the data in the data base memorized in the memory 69 so that the noise level in a required frequency range is reduced in accordance with operational environment and operational conditions, which are preliminarily given.

Thus, the variation of the duty ratio is optimized to reduce the noise level in the required frequency range as a target frequency range in accordance with the product.

(Modifications)

The range of variation of the communication frequency may be determined to be appropriately, for example, a range between plus/minus a few percents to plus/minus a few tens of percents together with a reference frequency as a center. Although the variation of frequency is periodically repeated, the variation may be changed at random.

Only the voltage level of "VLP" may be changed in the master 11.

In the slave 41, only one of the levels of "VL0," "VL1" and "VLS0" may be changed.

A construction for changing the driving level and/or a construction for changing the current driving performance may be formed in only one of the master 11 and the slave 41. Further, only one of the driving level and the current driving performance may be changed.

To change the rising slope and the decaying slope of the waveform in a case where the driving level is changed, the driving period may be changed. Specifically, the time for driving the bus 3a, 3b is shortened, and, in the rest of the time, the driving of the bus 3a, 3b is stopped. Thus, the impedance becomes high.

Although the SbW method is used for the above communication system, another method may be used form the above communication system as long as the another method provides a asynchronous communication among a master and multiple slaves together with a protocol of communication, in which a period for supplying an electricity to a bus from a master and a period for outputting a one-bit data through the bus by driving the bus with the maser or the slave are continuously repeated.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A method for determining a duty ratio of a PWM control comprising:
    outputting a PWM signal to a driving circuit so that switching of a load is controlled;
    determining a duty ratio target value of the PWM signal;
    changing the duty ratio of the PWM signal around the duty ratio target value as a center of a variation in such a manner that an average of the variation of the duty ratio in a predetermined period coincides with the duty ratio target value;
    measuring a noise level when the PWM signal is outputted to the driving circuit;
    memorizing a data of the noise level together with the variation of the duty ratio in the changing the duty ratio; and
    determining the variation of the duty ratio based on the data of the noise level when an operational environment or an operational condition are given so that the noise level in a given frequency range as a reduction object is reduced.

* * * * *